US005761569A

United States Patent [19]

[11] Patent Number: 5,761,569

[45] Date of Patent: Jun. 2, 1998

Kurando et al.

[54] IMAGE FORMING APPARATUS INCLUDING CONTROL DEVICE FOR CONTROLLING A PRE-TRANSFER CHARGER

[75] Inventors: Shigeo Kurando; Toru Tanjoh; Jun Kusakabe; Kazuhisa Kondo, all of Osaka, Japan

[73] Assignee: Mita Industrial Co., Ltd., Osaka, Japan

[21] Appl. No.: 812,666

[22] Filed: Mar. 10, 1997

[30] Foreign Application Priority Data

Mar. 12, 1996 [JP] Japan .................................... 8-054439

[51] Int. Cl.$^6$ ...................................................... G03B 15/16

[52] U.S. Cl. ................................ 399/44; 399/66; 399/296

[58] Field of Search ................................ 399/44, 66, 296; 361/235

[56] References Cited

U.S. PATENT DOCUMENTS

| | | | |
|---|---|---|---|
| 4,134,147 | 1/1979 | Watanabe | 361/235 |
| 4,912,515 | 3/1990 | Amemiya et al. | 399/44 |
| 5,128,717 | 7/1992 | Uchikawa et al. | 399/44 |
| 5,371,579 | 12/1994 | Bisaiji | 399/44 |

*Primary Examiner*—Joan H. Pendegrass

*Attorney, Agent, or Firm*—Beveridge, Degrandi, Weilacher & Young, LLP

[57] ABSTRACT

An image forming apparatus transfers a toner image formed on a photoconductive member onto transfer paper by passing the photoconductive member consecutively beside a main charger, exposure unit, developer unit, pre-transfer charger, transfer charger, and charge remover. During image formation under conditions with temperature or humidity lower than a predetermined level, the pre-transfer charger is deactivated.

3 Claims, 6 Drawing Sheets

IMAGE FORMING APPARATUS INCLUDING CONTROL DEVICE FOR CONTROLLING A PRE-TRANSFER CHARGER

BACKGROUND OF THE INVENTION

1. Field of the Invention

The present invention relates to an image forming apparatus such as an electronic photocopier, printer, or facsimile apparatus.

2. Description of the Prior Art

FIG. 1 schematically shows the construction of the principal portion of an electronic photocopier. In FIG. 1, reference numeral 1 represents a photoconductive drum, which rotates in the direction indicated by arrow A. Reference numeral 2 represents a main charger, reference numeral 3 represents a developer unit, reference numeral 4 represents a pre-transfer charger, reference numeral 5 represents a transfer charger, reference numeral 6 represents a separation charger, reference numeral 7 represents a cleaning unit, and reference numeral 8 represents a charge remover having a lamp. An exposure unit is disposed between the main charger 2 and the developer unit 3.

The developer unit 3 has a development sleeve 9, which rotates in the direction indicated by arrow B, and a stirring paddle 10. The cleaning unit 7 has a blade 11. The pre-transfer charger 4 is provided as an assistant means to improve toner transfer efficiency, since some types of paper, such as paper containing controlled moisture, tend to cause failure of toner transfer. Specifically, the pre-transfer charger 4 performs AC (alternating current) charging to lessen the electrostatic attraction between the drum 1 and toner.

Here, the charging current is an alternating current having an effective value of 230 pA and having its center (a direct current) at $-30\ \mu A$, as shown in FIG. 3. The photoconductive drum 1 is a hollow aluminum cylinder, whose outer surface is coated with photoconductive material and whose inner surface is coupled to a ground potential via a rotary shaft. As a result, as shown in FIG. 2, a current flows from ground to the charge wire 4*a* of the pre-transfer charger 4 in the direction indicated by arrow C.

During image formation, the outer surface of the photoconductive drum 1 is uniformly charged with positive electric charge by the main charger 2, and then the charge is removed from those portions of the surface which are exposed to light in the exposure unit. On the other hand, toner in the developer unit 3 is charged with negative electric charge, so that it is attracted to those portions of the surface in which the charge remains.

It should be noted that, if toner is incompletely mixed with a carrier (a magnetic substance) in the developer unit 3, part of the toner is left uncharged. In general, uncharged toner, even if it is attracted onto the drum 1, is not transferred onto transfer paper 12 (FIG. 2) by the transfer charger 5. By contrast, in a photocopier provided with a pre-transfer charger 4, since uncharged toner is charged with negative charge through pre-transfer charging, it is unnecessarily transferred onto those portions of the transfer paper 12 which should be left blank, causing so-called fogging.

SUMMARY OF THE INVENTION

An object of the present invention is to provide an image forming apparatus in which uncharged toner does not have undesirable effects on images produced even if the image forming apparatus is provided with a pre-transfer charger.

To achieve the above object, according to the present invention, an image forming apparatus for transferring a toner image formed on a photoconductive member onto transfer paper by passing the photoconductive member consecutively beside a main charger, exposure unit, developer unit, pre-transfer charger, transfer charger, and charge remover is provided with a control means that partially or totally suppresses the action of the pre-transfer charger during image formation under conditions with temperature or humidity lower than a predetermined level. As a result, according to the present invention, it is possible to eliminate fogging, which results from toner being unnecessarily transferred onto those portions of transfer paper which should be left blank, even under low-temperature or low-humidity conditions. Moreover, the control means is so designed as to increase the charging voltage of the transfer charger while the action of the pre-transfer charger is being partially or totally suppressed, so that high toner transfer efficiency is not lost even in such a situation.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
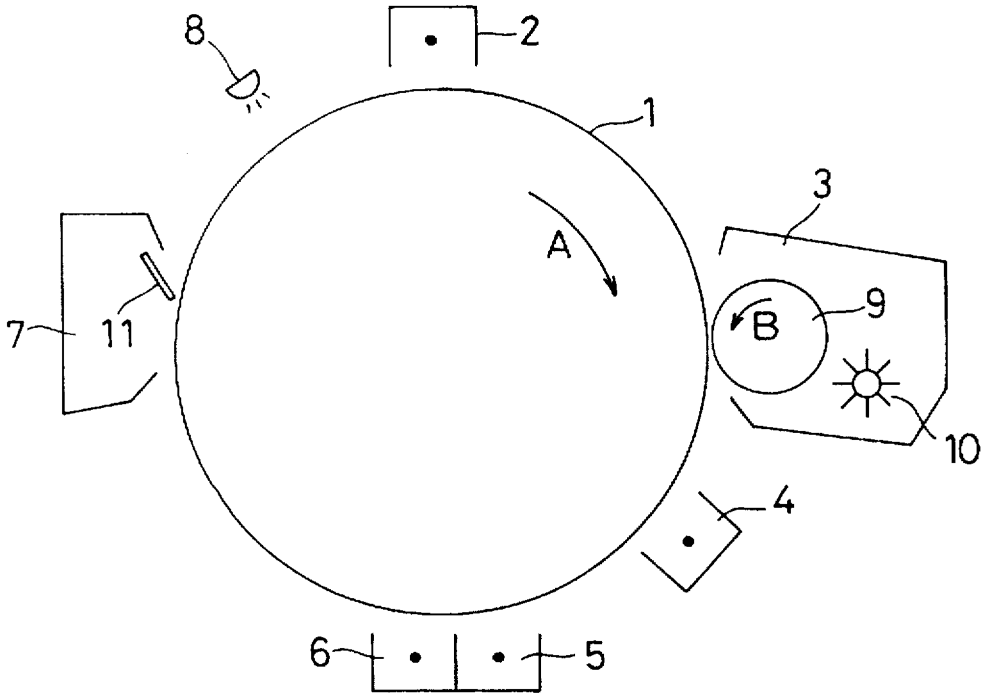
FIG. 1 PRIOR ART
FIG. 1 is a schematic diagram showing the construction of the principal portion of a conventional electronic photocopier.
Figure 2:
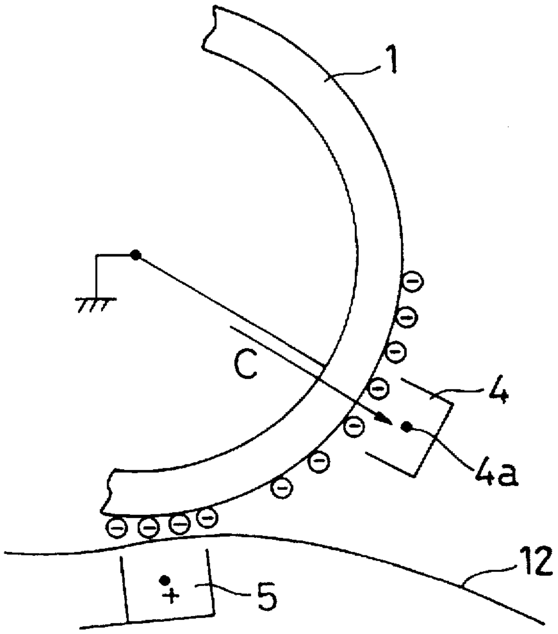
FIG. 2 PRIOR ART
FIG. 2 is a diagram illustrating the pre-transfer charger of a conventional electronic photocopier.
Figure 3:
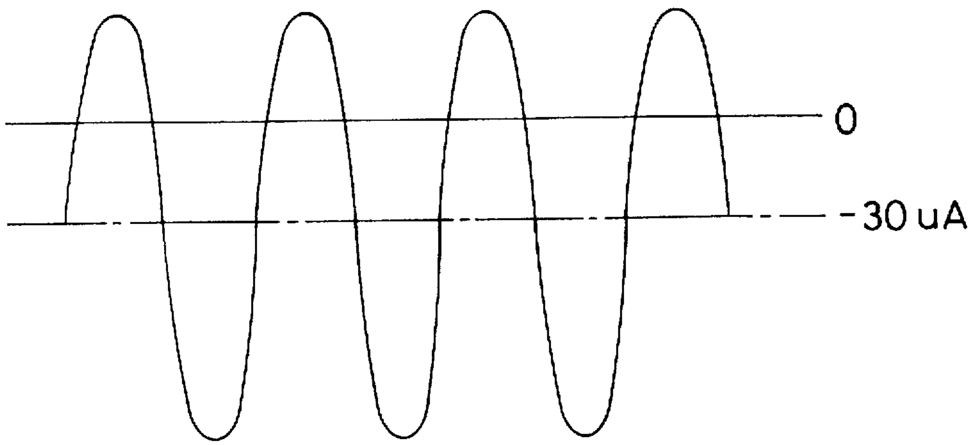
FIG. 3 PRIOR ART
FIG. 3 is a diagram showing the waveform of a current fed to the pre-transfer charger of a conventional electronic photocopier.
Figure 4:
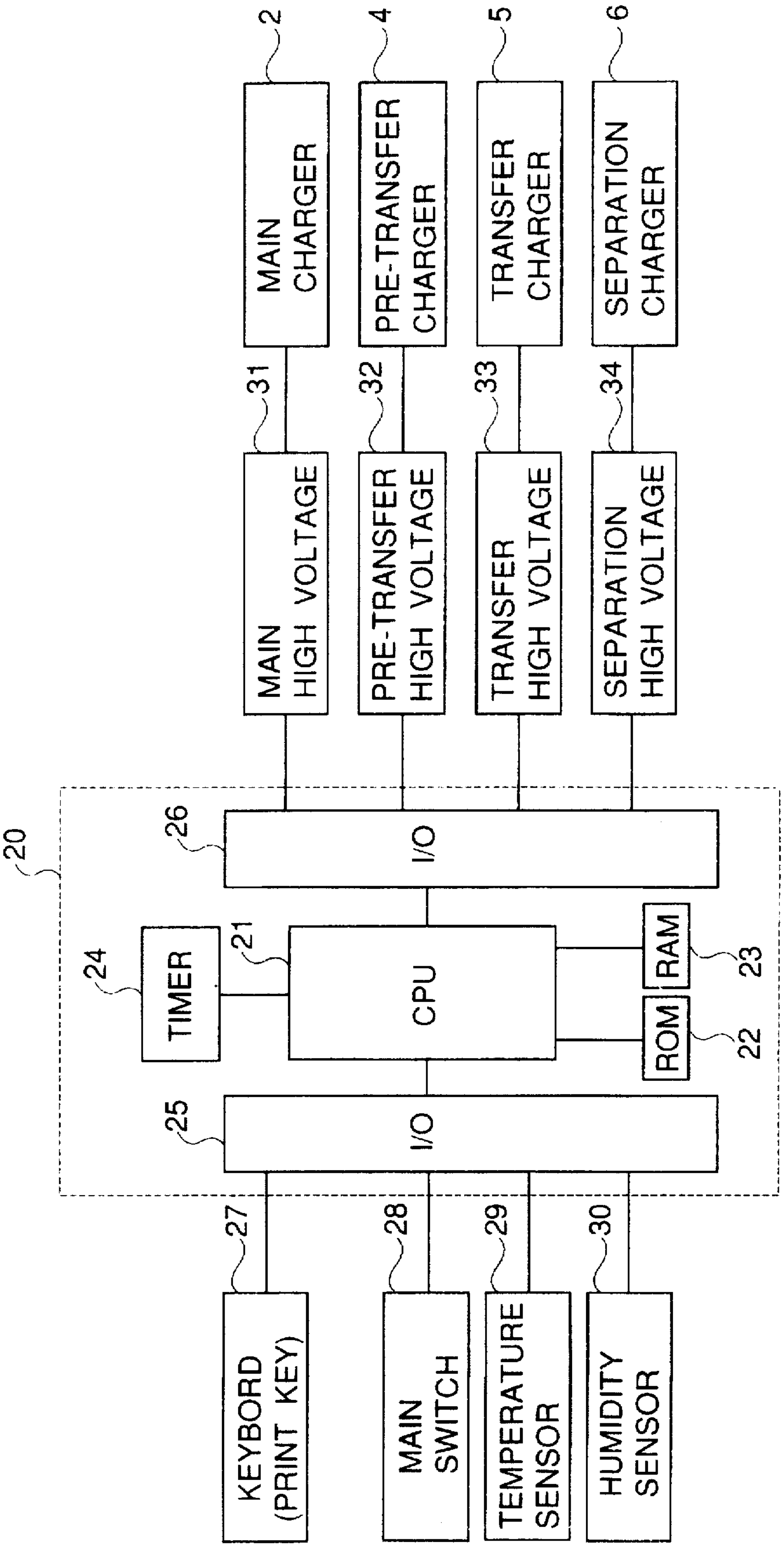
FIG. 4 is a block circuit diagram showing the construction of the control system of an electronic photocopier according to the present invention.

Hereinafter, embodiments of the present invention will be described with reference to the drawings. The present invention is typically embodied as a photocopier provided with image forming mechanisms as described above and as shown in FIG. 1. A photocopier according to the present invention is further provided with a control system as shown in FIG. 4. In FIG. 4, reference numeral 20 represents a microcomputer having a CPU 21, a program ROM 22, a non-volatile RAM 23, a timer 24, and I/O (input/output) ports 25 and 26.

Connected to the I/O port 25 are a keyboard 27 having a print key and other keys, a main switch 28, a temperature sensor 29, and a humidity sensor 30. The temperature sensor 29 and the humidity sensor 30 are placed inside the body of the photocopier. Connected to the I/O port 26 are a main high-voltage circuit 31 for supplying a voltage to the main charger 2, a pre-transfer high-voltage circuit 32 for supplying an AC voltage to the pre-transfer charger 4, a transfer high-voltage circuit 33 for supplying a positive DC voltage to the transfer charger 5, and a separation high-voltage circuit 34 for supplying an AC voltage to the separation charger 6.

Figure 5:
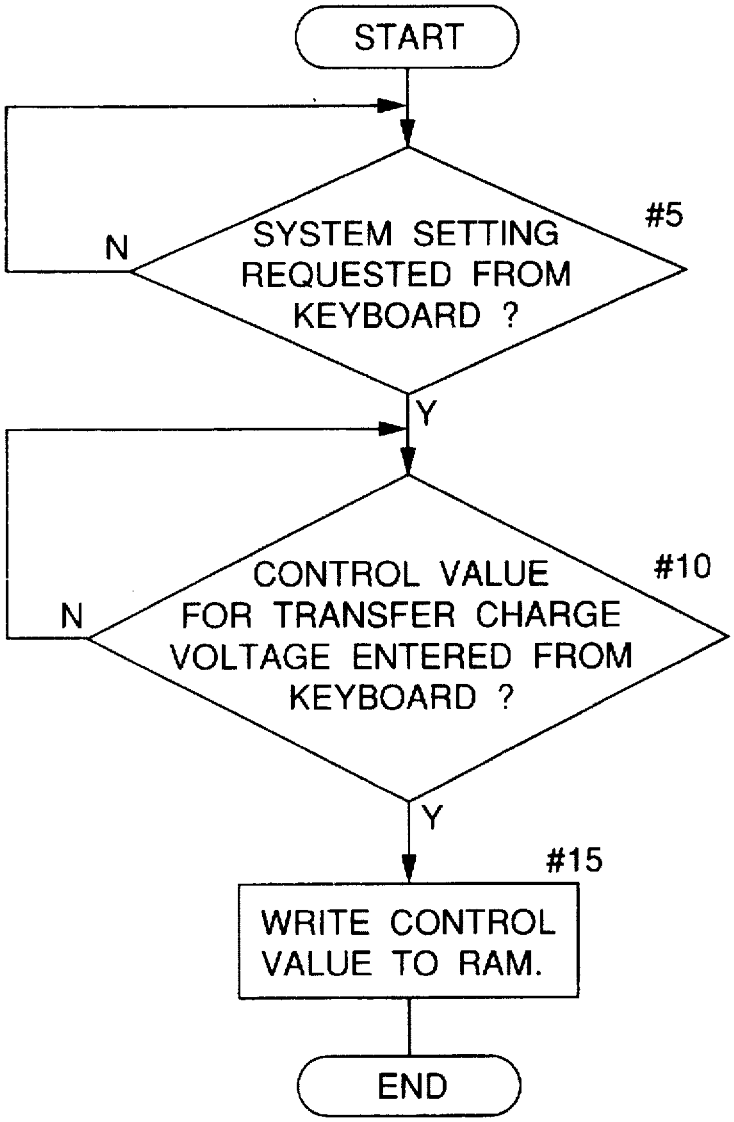
FIG. 5 is a flowchart showing a process performed in the first embodiment of the present invention.

Next, the control operations performed by the CPU 21 will be described with reference to the flowcharts of FIGS. 5 to 7. FIG. 5 shows a routine for establishing a variable-charge transfer mode. When this routine is started, the CPU 21 first checks, in step #5, whether system setting is requested from the keyboard 27.

If system setting is requested, the CPU 21 then waits, in step #10, for a control value of the transfer charge voltage to be entered from the keyboard 27. When a control value is entered, the CPU 21 writes, in step #15, the control value to the RAM 23, and then terminates the routine.

Figure 6:
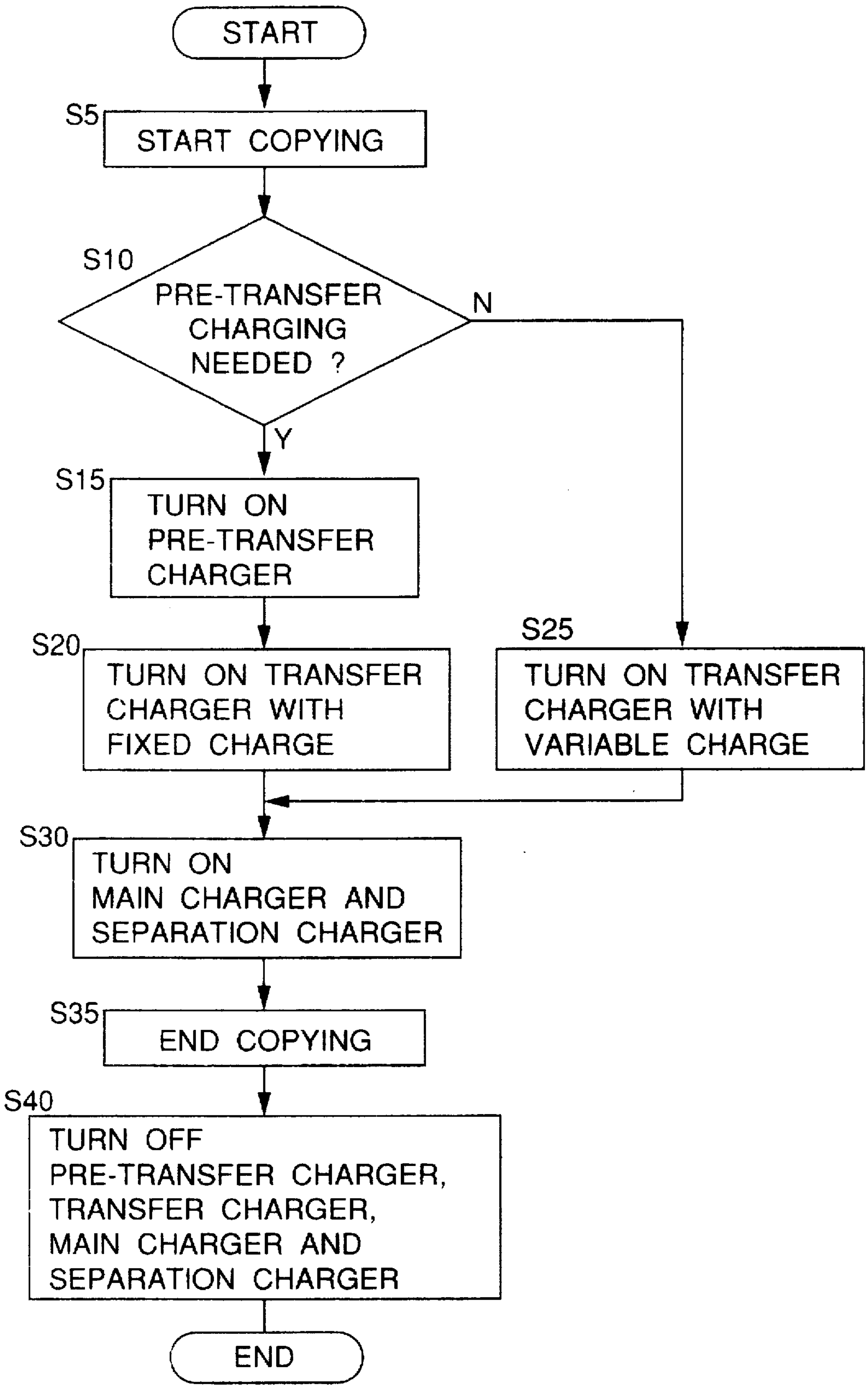
FIG. 6 is a flowchart showing another process performed in the first embodiment of the present invention.

FIG. 6 shows a routine for performing variable-charge transfer. When this routine is started, the CPU 21 first starts, in step S5, a copying operation, and then checks, in step S10, whether the pre-transfer charger 4 needs to be turned on. This check is performed on the basis of the outputs from the temperature sensor 29 and the humidity sensor 30.

If the detected temperature or humidity is below a predetermined level, the CPU 21 chooses not to turn on the pre-transfer charger 4, and proceeds to step S25 to control the transfer charger 5 in accordance with the control value that was previously (in step #15) stored in the RAM 23 (in this case, the control value is set to such a value that achieves higher transfer charge than under normal conditions). Thereafter, the CPU 21 proceeds to step S30.

By contrast, if the detected temperature and humidity are both above predetermined levels, the CPU 21 chooses to turn on the pre-transfer charger 4. In this case, the CPU 21 first activates, in step S15, the pre-transfer charger 4, and then activates, in step S20, the transfer charger by supplying thereto a normal voltage.

Figure 7:
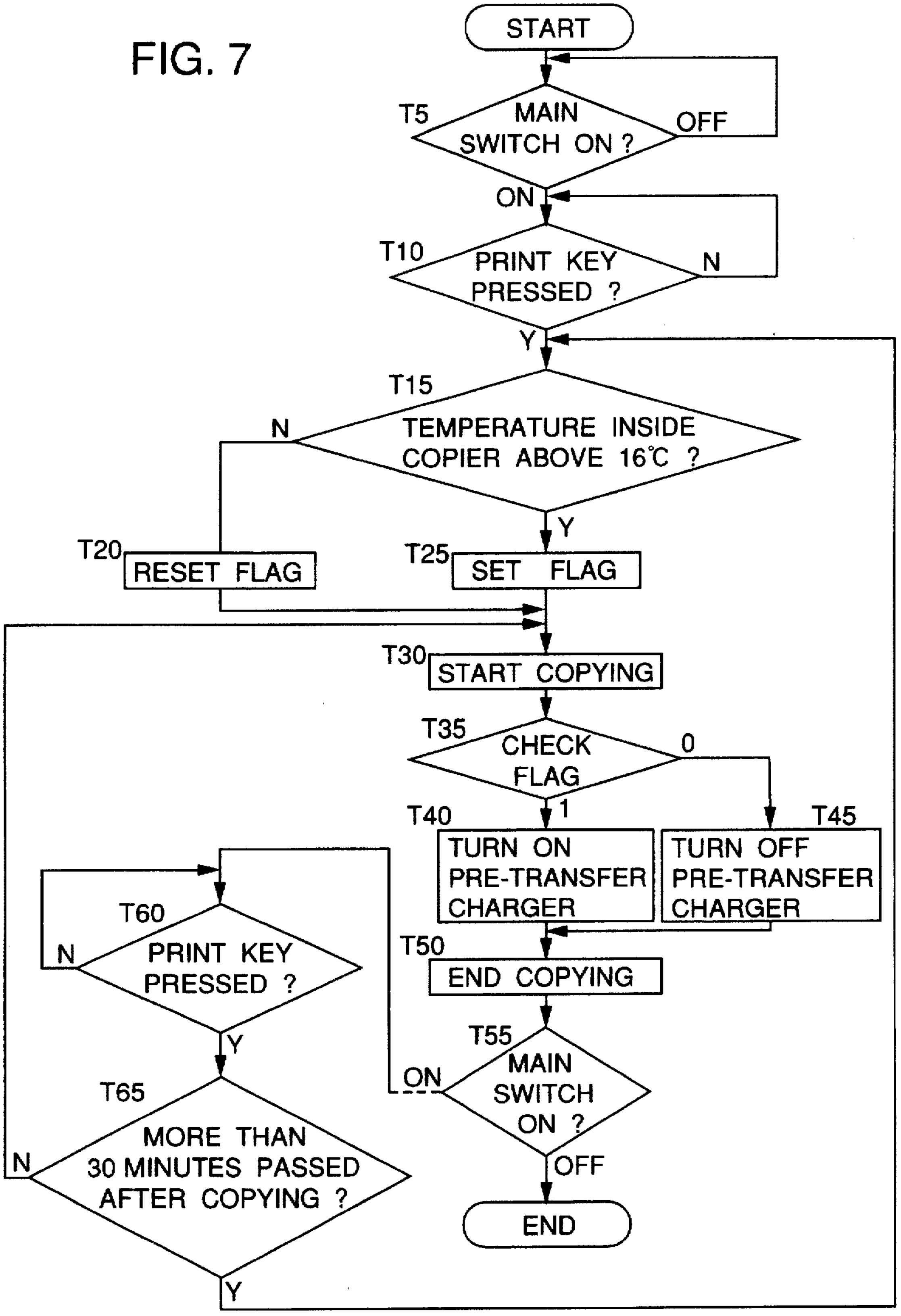
FIG. 7 is a flowchart showing a process performed in the second embodiment of the present invention.

FIG. 7 shows a modified routine for controlling the pre-transfer charger 4. In this routine, the pre-transfer charger 4 is controlled on the basis of temperature information alone, without any consideration of humidity. However, in this routine, the difference between the temperature of the atmosphere in which the photocopier is installed and the temperature inside the photocopier is compensated for.

It is preferable to determine whether pre-transfer charging is necessary or not on the basis of ambient temperature. However, since it is in practice difficult to install a temperature sensor outside the photocopier, the temperature sensor is usually placed inside the photocopier. In this case, since the temperature inside the photocopier depends on the condition of the photocopier, it does not always reflect ambient temperature. To overcome this inconvenience, the routine of FIG. 7 corrects readings of the temperature sensor so that proper control is achieved even when the temperature sensor is placed inside the photocopier.

When this routine is started, the CPU 21 first checks, in step T5, whether the main switch 28 is set to ON. When the main switch 28 is set to ON, the CPU 21 proceeds to step T10. When, in step T10, a print key is pressed, the CPU 21 checks, in step T15, whether the temperature inside the photocopier is above 16° C., on the basis of the output from the temperature sensor 29 placed inside the photocopier. If the temperature is above 16° C., the CPU 21 sets, in step T25, the flag that indicates that pre-transfer charging is necessary (i.e. set the flag to "1"). If the temperature is below 16° C., the CPU resets the flag (i.e. set the flag to "0") in step T20.

Subsequently, the CPU 21 starts, in step T30, a copying operation, and then checks, in step T35, whether the flag is set. Here, starting of a copy operation includes activation of the main charger 2, transfer charger 5, and separation charger 6. If the flag is set, the CPU 21 turns on, in step T40, the pre-transfer charger 4, and then proceeds to step T50.

If the flag is reset, the CPU 21 turns off, in step T45, the pre-transfer charger 4, and then proceeds to step T50 to terminate the copying operation. Here, termination of a copying operation includes deactivation of the main charger 2, transfer charger 5, and separation charger 6.

After termination of the copying operation, the CPU 21 proceeds to step T55 to check whether the main switch 28 is set to ON. If the main switch 28 is set to OFF, the CPU 21 terminates the routine. If the main switch 28 is set to ON, the CPU 21 proceeds to step T60 to wait for the print key to be pressed.

When the print key is pressed, the CPU 21 proceeds to step T65 to check whether more than 30 minutes has passed since termination of a previous copying operation (step T50). If more than 30 minutes has passed, the heat used in the previous copying operation is considered to have dissipated sufficiently, and therefore a reading of the temperature sensor 29 is considered to be close to the temperature outside the photocopier (ambient temperature).

In this case, since the ambient temperature may have changed from 30 minutes before, the CPU 21 returns to step T15 to check the temperature inside the photocopier again before starting a copying operation, and then determines whether pre-transfer charging is necessary or not. By contrast, if 30 minutes has not yet passed since termination of a previous copying operation (step T50), the heat used in the previous copying operation is not considered to have dissipated sufficiently, and therefore a reading of the temperature sensor is not considered to be close to the ambient temperature. On the other hand, the ambient temperature (the temperature outside the photocopier) is not considered to have changed greatly. Accordingly, in this case, the CPU 21 uses the result of the temperature check (T15) performed prior to the previous copying operation, and returns from step T65 to step T30 to start a copying operation.

Although the routine of FIG. 7 uses only temperature information to control the pre-transfer charger, it is also possible to achieve similar control on the basis of humidity information instead of temperature information according to FIG. 7.

What is claimed is:

1. An image forming apparatus for transferring a toner image formed on a photoconductive member onto transfer paper by passing said photoconductive member consecutively beside a main charger, an exposure unit, a developer unit, a pre-transfer charger, a transfer charger, and a charge remover, said apparatus further being provided with a control means for partially or totally suppressing action of said pre-transfer charger during image formation under conditions with temperature or humidity lower than a predetermined level, wherein said control means increases a charging voltage of said transfer charger when action of said pre-transfer charger is being partially or totally suppressed.

2. An image forming apparatus for transferring a toner image formed on a photoconductive member onto transfer paper by passing said photoconductive member consecutively beside a main charger, exposure unit, developer unit, pre-transfer charger, transfer charger, and charge remover, further provided with a temperature sensor, and a control means for controlling said pre-transfer charger in accordance with an output value from said temperature sensor, wherein said control means, in an image forming operation that takes place within a predetermined time period after termination of a previous image forming operation, controls pre-transfer charging in a same manner as in the previous image forming operation without taking into consideration the output value from said temperature sensor, and said control means, in an image forming operation that takes place past the predetermined time period after termination of the previous image forming operation, controls pre-transfer charging in accordance with the output value from said temperature sensor.

3. An image forming apparatus for transferring a toner image formed on a photoconductive member onto transfer paper by passing photoconductive member consecutively beside a main charger, exposure unit, developer unit, pre-transfer charger, transfer charger, and charge remover, further provided with a humidity sensor, and a control means for controlling said pre-transfer charger in accordance with an output value from said humidity sensor, wherein said control means, in an image forming operation that takes place within a predetermined time period after termination of a previous image forming operation, controls pre-transfer charging in a same manner as in the previous image forming operation without taking into consideration the output value from said humidity sensor, and said control means, in an image forming operation that takes place past the predetermined time period after termination of the previous image forming operation, controls pre-transfer charging in accordance with the output value from said humidity sensor.

* * * * *